US006274279B1

(12) United States Patent
Hampp et al.

(10) Patent No.: US 6,274,279 B1
(45) Date of Patent: Aug. 14, 2001

(54) PREPARATIONS OF BACTERIORHODOPSIN VARIANTS HAVING INCREASED MEMORY TIME, AND THEIR USE

(75) Inventors: Norbert Hampp; Andreas Popp; Dieter Oesterhelt; Christoph Bräuchle, all of München (DE)

(73) Assignee: MIB Munich Innovative Biomaterials GmbH, Martinsried (DE)

(*) Notice: Subject to any disclaimer, the term of this patent is extended or adjusted under 35 U.S.C. 154(b) by 0 days.

(21) Appl. No.: 08/381,839

(22) Filed: Feb. 3, 1995

(30) Foreign Application Priority Data

Aug. 13, 1992 (DE) .................................. 42 26 868

(51) Int. Cl.[7] ................. G03H 1/18; C07K 4/04
(52) U.S. Cl. .................. 430/1; 430/2; 430/945; 359/3; 365/125; 365/121; 369/110; 369/288; 530/350
(58) Field of Search .................. 430/1, 2, 290, 430/270, 945, 270.12; 435/252.3, 317.1, 320.1, 712, 711; 530/350, 300, 825, 400, 412, 417, 502; 359/1, 3; 369/110, 288; 365/121, 125, 124

(56) References Cited

U.S. PATENT DOCUMENTS

| 5,223,355 | * | 6/1993 | Hampp et al. | 359/3 |
| 5,253,198 | * | 10/1993 | Birge et al. | 365/125 |
| 5,374,492 | * | 12/1994 | Hampp et al. | 359/3 |
| 5,410,531 | * | 4/1995 | Tsujioka | 369/110 |

OTHER PUBLICATIONS

Abstract of JP 3–81756 Apr. 1991.*
Abstract of JP 2–251949 Oct. 1990.*
Kouyama et al., "Structure and function . . . " Adv. Biophys. 24 pp 123–175 (1988).*
Oesterhelt et al., "Bacteriorhodopsin . . . " Rev. Biophys. 24 (4) pp 425–478 (1991).*
Balashov et al., "Photochemical . . . "Biophys. 26 (3) pp 566–581 (1981).*
Chen et al., "Bacteriorhodopsin . . . " Applied Opt. 30(35) pp 5188–5196 (1991).*
Dyukova et al. "Change in the photochemical . . . ", Biophys. 30 (4) pp 668–672 (1985).*
Chang et al. "The Pink membrane . . . " Biophys. J. Biophys. Soc. 52 pp 617–623 (1987).*
Lin et al. "the quantum efficiency . . . " Photochem. & Photobiol. 46 (2) pp 263–267 (1987).

Tsuji et al. "the low ph . . . " FEBS lett. 98 (2) pp 368–372 (1978).
Miller et al., "kinetic optimization . . . " Biochim. & Biophysica Acta 1020 pp 57–64 (1990).
Oesterhelt et al. Ann. Microbiol. 134B pp 137–150 (1988).
Soppa et al. "Bacteriorhodopsins . . . " J. Biolog. Chem. 264 (22) pp 13043–13048 (1989).
Butt et al. "Aspartic Acids . . . " The EMBO Journal 8 (6) pp 1657–1663 (1989).
Vsevolodov et al. "Biological light . . . " Biophys. 30 (5) pp 962–967 (1985).
Rafi Korenstein and Benno Hess, FEBS LETTERS, vol. 82, No. 1, p. 7–11, Oct. 1977, "Hydration Effects on CIS–TRANS Isomerization of Bacteriorhodopsin".
Y. Kimura, A. Ikegami, W. Stoeckenius, Photochemistry and Photobiology, vol. 40, No. 5, pp. 641–646, 1984, "Salt and pH–dependent Changes of the Purple Membrane Absorption Spectrum".
J. Soppa, D. Oesterhelt, Biol. Chem. Hoppe–Seyler vol. 368 (1987), p. 1116; Isolation and characterization of Bacteriorhodopsin–mutants of Halobacterium GRB.
Baofu Ni, Man Chang, A. Duschl, J. Lanyi, R. Needleman, Gene 90 (1990), p. 169–172, "An efficient system for the synthesis of bacteriorhodopsin in Halobacterium halobium".
N. Hampp, C. Bräuchle, D. Oesterhelt, SPIE, vol. 1125, Thin Films in Optics (1989), Optical Properties of Polymeric Films of Bacteriorhodopsin and its Functional Variants: New Materials for Optical Information Processing.
Studies in Organic Chemistry 40– PHOTOCHRO H. Dürr Elsevier, Amsterdam NL, Chapter 29, Bacteriorhodopsin and its funtional variants, N. Hampp, p. 954–975.

* cited by examiner

*Primary Examiner*—Martin Angebranndt
(74) *Attorney, Agent, or Firm*—Collard & Roe, P.C.

(57) ABSTRACT

Compositions of bacteriorhodopsin variants with increased memory time and their use for reversible optical information recording are disclosed. The compositions are characterized in that the configuration of the retinal of the photoproduct is different from the configuration of the retinal of the initial state and other than 13-cis; the pH value of the composition lies between 3 and 11; the water content of the composition lies between 1 and 30% by weight with respect to the total weight of the composition; and additives for modulating the proton mobility are present in a concentration between 1 and 80% by weight of the mass of purple membrane composition used, and if required matrix materials in a concentration of up to 10% by weight with respect to the total weight of the composition are present. These compositions may be used in reversible information recording systems.

12 Claims, No Drawings

PREPARATIONS OF BACTERIORHODOPSIN VARIANTS HAVING INCREASED MEMORY TIME, AND THEIR USE

The invention relates to preparations of bacteriorhodopsin variants having increased memory time, and their use for reversible optical information recording.

The retinal protein bacteriorhodopsin is a biological photochrome which is distinguished by its high thermal, chemical and photochemical stability and its high photosensitivity 'P. Kouyama, K. Kinositu and A. Ikegami: Structure and Function of Bacteriorhodopsin, Adv. Biophys. 24 (1988), pp. 123–175'. In applications, this retinal protein is preferably employed in the form of a purple membrane. Purple membranes are built up from a dense, two-dimensional, usually crystalline arrangement of the bacteriorhodopsin included in a lipid double layer. This form has particularly high stability; bacteriorhodopsin which has been dissolved out is much more unstable.

Owing to its photochromic property, this retinal protein can be used for optical information recording. When exposed to light, a configuration change is induced in the retinal residue. This change in configuration is reversible both thermally and photochemically. In wild-type BR, it proceeds from all-trans in the initial state to 13-cis in the longest-lived intermediate. Associated with this is a reversible change in the protonation state of the Schiff base bond by means of which the retinal residue is coupled to the protein.

In optical information recording, a distinction is generally made between short-term memory, which is required in data processing, and long-term memory, as is necessary for information storage.

The advantages of purple membranes for these applications lie in the high resolution that can be achieved, since the structure size of the active elements, i.e. the bacteriorhodopsin molecules, is in the order of a few nm, in the high light fastness of the material and in the excellent shelf life.

A review of possible industrial applications of purple membranes is given in 'D. Oesterhelt, C. Bräuchle, N. Hampp: Bacteriorhodopsin: A Biological Material for Information Processing. Quarterly Reviews of Biophysics, 24 (1991), pp. 425–478'. This article also describes preparations, in particular films for holography, in which transient recordings of optically written information is in the forefront.

In addition to these applications as short-term memories in the area of information processing, there is also interest in storing optical information for a longer period. There is particular interest in media which can be written by means of light of a first wavelength $\lambda 1$ and erased with light of a second wavelength $\lambda 2$. These reactions can be described formally by a reaction scheme $E-(\lambda 1)-P-(\lambda 2)-E$, where E is the starting or initial state of the material and P is a long-lived photoproduct of E, known as the memory state, which is itself likewise photochemically active.

The memory time is defined as the period within which 36.8% (1/e) of the photoproduct relaxes without exposure to light, i.e. for example, thermally, into another state, for example the starting state. The memory time of a medium is proportional to the life of the state serving for information storage.

The memory time can be determined by measuring the time-dependent change in absorption at the maximum of the absorption band of the initial state or of the memory state. If the absorption state of a storage medium is used for coding information, the achieveable contrast ratio, which is in turn wavelength-dependent, is the determining factor for the signal/noise ratio. The contrast ratio is defined as the quotient of the absorption of a photochromic material before and after exposure. The maximum contrast ratio is achieveable at the wavelength at which the difference spectrum between the unexposed and exposed material has a maximum. At this point, the contrast ratio is limited only by the maximum achievable conversion of the starting material into the photoproduct.

Of considerable interest for industrial applications is the number of possible write/erase cycles, i.e. how often the material can be switched to and fro between the states E and P using light. This number should be as large as possible.

A general problem in the use of photochromic materials for reversible information recording is that reading or scanning of the stored information with light wavelengths in the region of the absorption of initial or memory state results in a change in the information and thus a reduction in the signal/noise ratio. In the case of digital information (black/white), this can be compensated by refreshing the information after reading. In the is case of analog signal recording, this is impossible in practice. For this reason, photochromic materials are virtually never used for reversible recording of analog signals (grey value recording).

The photocycle of wild-type bacteriorhodopsin ($BR_{WT}$) is known. The longest-lived intermediate in this photocycle is known as the M-state. The absorption maximum of the M-state, which is at 410 nm, differs by 160 nm from the initial state of $BR_{WT}$, which is known as the B-state and has an absorption maximum of about 570 nm. Irradiation of the B-state with light having a wavelength in the region of its absorption band, for example having the wavelength 570 nm±60 nm, initiates a photochemical reaction of high quantum yield (on average $\geq 64\%$) which results in population of the M-state within 50 µs. In an aqueous suspension of $BR_{WT}$ purple membrane, the M-state has a life of about 10 ms. The M-state can be switched back into the initial state by means of light having a wavelength in the region of its absorption band, for example the wavelength 410 nm. In this form, the $B_{WT}$ purple membrane is unsuitable as an information memory. In order to be able to employ $BR_{WT}$ as an information memory, the M-state must have the longest possible life.

Two possibilities are known for increasing the life of the M-state:

1. Low temperatures: At temperatures of $<-50°$ C., the M-state can be "frozen", i.e. its thermal relaxation is suppressed 'S. P. Balashov, F. Litvin, Photochemical Conversions of Bacteriorhodopsin, Biophys. J. 26 (1981), pp. 566–581'. The possibility of returning $BR_{WT}$ into the ground state at these temperatures by photochemical means using blue light, for example 410 nm, is retained.

2. Dehydration: By removing water from $BR_{WT}$ preparations, the life of the M-state can be extended to about 150 sec. 'R. Korenstein, B. Hess, Hydration Effects of cis-trans Isomerization of Bacteriorhodopsin, FEBS Lett. 82 (1977), pp. 7–11', 'Z. Chen, A. Lewis, H. Takei, I. Nebenzahl, Application of Bacteriorhodopsin Oriented in Polyvinyl Alcohol Films as an Erasable Optical Storage Medium, Appl. Opt. 30 (1991), pp. 188–196', 'T. V. Dyukova, N. N. Vsevolodov, L. N. Chekulaeva, Change in the Photochemical Activity of Bacteriorhodopsin in Polymer Matrices on its Dehydration, Biophysics 30 (1985), 668–672'.

The use of purple membranes containing $BR_{WT}$ at low temperatures has the following disadvantages, inter alia:

Permanent cooling is necessary during use. Special equipment must be used to exclude condensation of atmospheric moisture on the storage medium. Loss of data is possible due to failure of the electric supply for cooling or due to other technical defects. These disadvantages are unacceptable for industrial use, the use of $BR_{WT}$ is therefore of no industrial importance.

The same applies to the extension of the M-life by dehydration. This has the disadvantage, inter alia, that the achievable memory times in the region of minutes are orders of magnitude below the memory times required industrially in the region of from one day to 10 years.

It is furthermore known that purple membranes containing $BR_{WT}$ are converted into a blue form at pH values of less than 3. This form is known as 'blue membrane' (K. Kimura, A. Ikegami, W. Stoeckenius, Salt and pH-dependent Changes of the Purple Membrane Absorption Spectrum, Photochem. Photobiol. 40 (1984), pp. 461–464). This form is also obtained if ions, in particular divalent cations (for example $Ca^{2+}$, $Mg^{2+}$) are removed from the purple membrane suspension (C. H. Chang, S. Y. Liu, R. Jonas, R. Godvinjee, The Pink Membrane: The Stable Photoproduct of Deionized Purple Membrane, Biophys. J. 52 (1987), pp. 617–623). This form is photochemically active and can be converted into a pink form, known as 'pink membrane' (S. Y. Liu, T. g. Ebrey, The Quantum Efficiency for the Interconversion of the Blue and Pink Forms of Purple Membrane, Photochem. Photobiol. 46 (1987), pp. 263–267). This pink form is likewise photochemically active and can be converted back into the blue form using light. These blue membranes are of no industrial value since they have very inadequate photochemical stability and are irreversibly bleached even at low irradiation intensity. (K. Tsuji, K. Rosenheck, The Low pH-species of Bacteriorhodopsin. FEBS Lett. 98 (1979), pp. 368–372). The reversibility of these blue membranes is considerably fewer than 500 write/erase cycles.

Also known is a bacteriorhodopsin variant containing a photoproduct which is more stable at room temperature than that of $BR_{WT}$.

In this bacteriorhodopsin variant, the amino acid Asp is replaced in position 96 by Asn. The retinal configuration of the initial state and the longest-lived intermediate correspond to the respective configuration of the wild type. In the purple membrane variant containing this bacteriorhodopsin variant, the life of the longest-lived photoproduct is dependent on the ambient pH. It can be adjusted by means of the ambient pH and is extended at alkaline pH values. Lives for the longest-lived photoproduct of up to 163 s at a pH of 9 have been achieved (A. Miller, D. Oesterhelt, Biochim. Biophys. Acta 1020 (1990) pp. 57–64; Kinetic optimization of bacteriorhodopsin by aspartic acid 96 as an internal proton donor). Use of highly alkaline pH values (13–14) is impossible since this drastically reduces the stability of the protein and thus the possible service life of a recording medium produced therefrom.

Modifications of the wild-type form of bacterio-rhodopsin obtained by replacement of the retinal chromophor are of only low industrial importance since they can only be prepared by preparing and purifying chromophor free purple membrane ('Apomembrane') and subsequently adding the synthetic retinal analog. These steps are expensive. In addition, purple membranes are generally obtained in which not all bacteriorhodopsin molecules contain retinal analogs.

The object of the invention was to indicate preparations of purple membrane variants having advantageous properties, in particular having an extended life of a photoproduct at room temperature compared with known purple membrane variants.

The object is achieved by preparations containing at least one purple membrane variant in which more than 50% of a bacteriorhodopsin variant is converted at room temperature into a photoproduct having an absorption maximum which is shifted spectrally by at least 10 nm compared with the initial state by irradiation with light having a wavelength in the region of the absorption band of the initial state, where the photoproduct can be converted back into the initial state by irradiation with light having a wavelength in the region of its absorption band, wherein the configuration of the retinal of the photoproduct is modified compared with the configuration of the retinal of the initial state and is different from 13-cis, and/or the Schiff base bond of the retinal has been hydrolyzed, and/or the photoproduct has a memory time of more than one day, and/or the photoproduct allows at least $10^4$ write/erase cycles with retention of at least 50% of the original contrast ratio, and the pH of the preparation is between 3 and 11, and the water content of the preparation is between 1 and 30% by weight, based on the total weight of the preparation, and auxiliaries for modulation of the proton mobility are present in a concentration of between 1 and 80% by weight, based on the amount of purple membrane preparation employed, and, if desired, matrix materials are present in a concentration of up to 10% by weight, based on the total weight of the preparation.

Purple membrane variants are purple membranes containing one or more bacteriorhodopsin variants.

Bacteriorhodopsin variants are defined as bacteriorhodopsins which differ from wild-type bacteriorhodopsin through the replacement and/or insertion and/or deletion of one or more amino acids and/or the replacement of the retinal chromophor by a retinal-analogous pigment.

Purple membrane variants which are suitable for the preparation of the preparations according to the invention are those which, on irradiation with light, form a photoproduct which has a retinal configuration which is different from 13-cis, preferably 9-cis. Also suitable are purple membrane variants which, on irradiation with light, form a photoproduct which contains a free retinal molecule in the binding position of the protein.

Suitable purple membrane variants can be prepared, for example, by means of processes indicated by D. Oesterhelt, G. Krippahl, Ann. Microbiol. (Inst. Pasteur) 134B (1983), pp. 137–150; Phototrophic Growth of Halobacteria and Its Use for Isolation of Photosynthetically-Deficient Mutants or J. Soppa, D. Oesterhelt, J. Biol. Chem. 264 (1989), pp. 13043–13048; Bacteriorhodopsin Mutants of Halobacterium spec. GRB. 1. The 5-Bromo-2'-Desoxyuridine-Selection as a Method to Isolate Point Mutants in Halobacteria. Or J. Soppa, D. Oesterhelt, Biol. Chem. Hoppe-Seyler 368 (1987), pp. 1116; Isolation and Characterization of Bacteriorhodopsin Mutants of Halobacterium GRB or B. F. Nix, M. Chang, A. Duschl, J. Lanyi, R. Needleman; An Efficient System for the Synthesis of Bacteriorhodopsin in Halobacterium halobium, Gene 90 (1990), pp. 169–172.

These purple membrane variants can be isolated and purified by known methods. These are described, for example, in S. Neuman, H. Leigeber, Process for the preparation of purple membrane containing bacteriorhodopsin, DE 3922133, filed on Jul. 5, 1989, corresponds to U.S. Pat. No. 5079149, granted on Jan. 7, 1992.

Purple membrane variants which are suitable for the preparation of novel preparations are, for example, those in which the configuration of the retinal chromophor of the photoproduct is 7-cis, 11-cis or 9-cis, those having the configuration 9-cis being preferred.

Purple membrane variants which are particularly preferably suitable for the preparation of the novel preparation are those which contain the bacteriorhodopsin variant $BR_{D85, 96N}$.

This purple membrane variant is obtainable, for example, by the processes which have already been disclosed from the Halobacterium strain L33, which has been transformed with the vector p319/D85,96N. L33 (DSM 5735) has been deposited in accordance with the Budapest treaty at the DSM, Deutsche Sammlung für Mikroorganismen [German Collection of Microorganisms] on Jan. 3, 1990. p319/D85,96N (DSM 6225) has been deposited in accordance with the Budapest treaty at the DSM, Deutsche Sammlung für Mikroorganismen [German Collection of Microorganisms] on Jan. 31, 1990. A process for the production of this and other suitable strains is described in German Patent Application P 40 37 342.8, filed on Nov. 23, 1990 which correspond to U.S. Pat. No. 5,290,699 issued Mar. 1, 1994.

A suitable purple membrane variants is adjusted to a pH of from 3 to 11, preferably to a pH of 4 to 6, by means of a buffer. From 1 to 80% by weight, preferably from 5 to 20% by weight, based on the dry weight of the purple membrane variant, of auxiliaries are added in order to modulate the proton mobility. Auxiliaries for modulation of the proton mobility are, for example, one or more substances selected from the group consisting of glycerol, guanidine, arginine, urea, diethylamine, azides, cyanates, mono-, di- and polysaccharides, and mono- or polyfunctional alcohols. Preference is given to glycerol, arginine and/or diethylamine. Glycerol is particularly preferably suitable.

If necessary for the particular application of the preparation, up to 10% by weight of matrix materials can also be added. Matrix materials which can be employed are polyacrylamide, gelatin, agarose, agar, polyvinylpyrrolidone, polyvinyl alcohol, polyvinyl acetate, polyhydroxymethacrylate, polyacrylate or mixtures of these substances. The water is removed from the resultant suspension to a residual content of from 1 to 30%, preferably to a residual content of from 5 to 20%, based on the total weight of the preparation.

The removal of water from purple membrane suspensions can be achieved by sedimentation in centrifuges, drying or repeated dialysis against the desired solvent. If desired, more than one of these methods can be combined.

These preparations of purple membrane variants have, at room temperature, a thermally stable photoproduct which has a memory time of more than one day.

The preparations also enable at least $10^4$ write/erase cycles with retention of at least 50% of the original contrast ratio.

If a purple membrane variant containing the bacteriorhodopsin variant $BR_{D85,96N}$ is employed, the preparation prepared according to the invention in accordance with the above provisions has a memory time of at least one month.

When the novel preparation is used for information storage, the thermally stable states of the novel recording material are suitable as both the initial state and the memory state.

For the purposes of the invention, the assignment of initial and memory state to the thermally stable states of the novel recording material are therefore exchangeable.

In preferred embodiments the absorption maxima of the initial state and of the photoproduct of the preparations are in the emission range of solid or semiconductor lasers.

The novel preparations are preferably used in the form of films having an optical density at the absorption maximum of from 0.1 to 10, preferably from 1 to 3.

If a novel preparation is to be used for the production of films containing purple membrane, it is applied to the surface of a substrate of controlled optical quality under the action of gravity and sealed to a second substrate. For the production of films containing immobilized purple membrane, the spin-coating method is also suitable.

The novel films containing purple membrane can be used, for example, in systems for reversible information recording. Such a system for reversible information recording using BR films comprises a novel preparation as recording material, a writing light source of a first wavelength, a second light source for reading the stored information and, if necessary, a light source of a third wavelength for erasing.

The information is written by irradiating the preparation with light of a wavelength in the region of the absorption maximum of the initial state. The light source for the reading of the information has a wavelength within the absorption band of the initial or memory state. By means of this, the absorption state of the novel material is determined. By means of this process, stored information can only be read absorptively and not phase-sensitively. This means that the stored information is destroyed on reading.

For use of the novel preparations, it is desirable to have available a process which allows non-destructive reading of the stored information.

In such a process, the recording of the information on the novel preparations and the reading of the information are carried out using linear-polarized light, in each case of a different wavelength. By irradiation with linear-polarized light of a wavelength in the region of the absorption maximum of the initial state, a photochemical change is induced in the preparation. This results in an anisotropic absorption distribution in the preparation. In parallel, an anisotropic distribution of the refractive index also occurs.

The non-destructive reading of the information stored in this way is carried out by irradiating the preparation with a photochemically inactive linear-polarized detection beam whose polarization direction is neither parallel nor perpendicular to the polarization direction of the excitation light. Suitable light for reading preferably has a wavelength in the range from 360 nm to 3 μm, particularly preferably in the range from 650 nm to 850 nm. The photochemically inactive linear-polarized detection beam preferably has a polarization direction rotated by 45° with respect to the polarization direction of the recording light. After passing through the recording material, the polarization state of the detection beam has changed. This change in the polarization state of the detection beam is determined. This can be carried out, for example, by measuring its intensity perpendicular to its original polarization direction. This measurement can be carried out, for example, using a linear-polarization filter.

The erasing of the information can be carried out by irradiation with polarized or unpolarized light of a wavelength in the region of the absorption band of the memory state. The duration of the irradiation depends on the particular operating parameters, such as wavelength and/or power of the irradiation light or on the material concentration and/or layer thickness in the preparation.

The system/process described can be employed for the storage of digital and analog information. The information can be stored in the material either directly or holographically.

In addition, the novel preparations can also be employed in all known methods for optical information storage, as known from the prior art.

By means of said purple membrane preparations, reversible optical data carriers with parallel input and output can be achieved. In addition, spatial light modulators for the IR region with polarization coding can be achieved. Reconfigurable optical and/or holographic memories for applications in the area of optical neural networks, associative memories and pattern recognition are other application examples. Use of the novel preparations as reconfigurable absorbers, optical elements or reconfigurable phase modulators is likewise possible (Technical Digest on Spatial Light Modulators and Applications, Optical Society of America, Washington 1990).

The preparations can also be employed in combination with a transient storage medium or in mixtures with other purple membrane variants.

Layering of BR media of known type and the long-term storage media described here enables (a) by writing with various wavelengths, (b) by writing with various intensities (or energies=intensity×time), information to be written selectively (i) exclusively into the short-term memory, (ii) both into the short-term and long-term memory, (iii) exclusively into the long-term memory. Optical comparison of the information in the short-term and long-term memory allows information processing methods of known type to be achieved in a simple manner.

The invention is described below with reference to examples and comparative examples.

EXAMPLE 1

1.0 ml of purple membrane suspension of type $BR_{D85,96N}$ having an optical density of 20 at 600 nm was introduced into a microdialysis chamber sealed with a dialysis membrane having a pore size of 24 Å. The purple membrane suspension was dialyzed against a mixture of 80% by weight of glycerol and 20% by weight of a 100 mM pH 5.0 citrate buffer containing 50 mM of NaCl. The dialysis was carried out for 36 hours, during which the buffer/glycerol/salt mixture was changed twice. The material obtained was introduced between two plane-ground glass plates separated by a PVC spacer having a thickness of 100 μm.

The resultant film of $BR_{D85,96N}$ has an absorption spectrum of the initial state E with an absorption maximum of 575 nm and a half-value width of the absorption band of 150 nm.

Irradiation with light of wavelength 676 nm causes the intensity-dependent formation of a photoproduct P having an absorption maximum of 490 nm and a half-value width of the absorption band of 180 nm. This photoproduct contains 9-cis retinal. Irradiation at an intensity of 140 mW/cm² for a period of 10 minutes causes more than 90% completion of this reaction. The memory time of this purple membrane preparation at room temperature is considerably more than 30 weeks. After 8 months, less than 20% of the photoproduct P had decomposed. The initial state was restored by irradiation of the photoproduct P for 10 minutes with light of wavelength 532 nm at an intensity of 140 mW/cm².

Information in for example a dot pattern (see FIG. 1), written by means of linear-polarized light of wavelength 676 nm was readable either selectively or overall by means of linear-polarized light of wavelength 799 nm whose polarization was rotated by 45° with respect to the polarization direction used during recording. To this end, the purple membrane preparation was irradiated with light of wavelength 799 nm. A linear-polarization filter was positioned behind the purple membrane preparation and was adjusted so that no transmission was observed in the areas where the purple membrane preparation was not irradiated. In the areas where the purple membrane preparation contains the photoproduct or the memory state, transmitted intensity was observed.

EXAMPLE 2

0.5 ml of a purple membrane suspension of type $BR_{D85,96N}$ having an optical density of 20 at 600 nm was mixed with 9.5 ml of pH 5 citrate buffer (100 mmol/l) containing 50 mmol/l of sodium chloride and 6% (vol/vol) of glycerol. The pH was monitored by means of a glass electrode. The resultant suspension was introduced into a Teflon cylinder (internal diameter 16.2 mm) sealed by means of a plane-ground glass plate (diameter 22.4 mm) and fitted into a suitable centrifugation holder. The mixture was centrifuged for 45 minutes at 23,000 rpm in an ultracentrifuge using a TST 28.2 rotor. The clear supernatant was subsequently discarded. The purple membrane film obtained had the diameter of the interior of the cylinder and was dried for 24 hours at 20° C. and 30% relative atmospheric humidity. The film was pressed by means of a plane-ground glass plate (diameter 22.4 mm) using a 20 μm stainless steel ring as spacer. The resultant film had a water content of 5% by weight (weight loss during drying for 24 hours at 20° C. over $CaCl_2$). The photoproduct obtained by irradiation for 14 minutes with light of wavelength 676 nm at an intensity of 100 mW/cm² had a memory time of about one week.

Non-destructive reading of the information was possible as described in Example 1.

Comparative Example 1

The procedure was as in Example 1, but, instead of glycerol, the said buffer and NaCl (100 mM pH 5.0 citrate buffer containing 50 mM NaCl) were added to water, and the $B_{D85,96N}$ suspension was dialyzed against the mixture. The resultant film was irradiated as in Example 1 with linear-polarized light of wavelength 676 nm (140 mW/10 min). The information written in this way cannot be read after the information-carrying light has been switched off, since the memory state is too short-lived.

Comparative Example 2

The procedure was as in Example 2. Instead of a purple membrane containing the bacteriorhodopsin variant $BR_{D85,96N}$, a purple membrane was used containing the bacteriorhodopsin variant $BR_{D96N}$. The photointermediate populated as described in Example 1 has a memory time of less than 10 minutes.

Comparative Example 3

The procedure was as in Comparative Example 2. Instead of a purple membrane containing the bacteriorhodopsin variant $BR_{D96N}$, a purple membrane was used containing the bacteriorhodopsin variant $BR_{D85E}$ (H. J. Butt et al., Aspartic acids 96 and 85 play a central role in the function of bacteriorhodopsin as a proton pump, the EMBO Journal vol. 8, no. 6 (1989), pp. 1657–1663). The populated photointermediate has a life of about 4.5 hours.

What is claimed is:

1. A composition containing at least one purple membrane variant in which more than 50% of a bacteriorhodopsin variant is converted at room temperature into a photoproduct having an absorption maximum which is shifted spectrally by at least 10 nm compared with the absorption maximum of the initial state by irradiation with light having a wavelength in the region of the absorption band of the initial state, where the photoproduct can be converted back into the initial state by irradiation with light having a wavelength in the region of its absorption band, wherein the configuration of the photoproduct which is a retinal is modified compared with the configuration of the retinal of the initial state and is different from 13-cis;

or a Schiff base bond of the retinal has been hydrolyzed;

and the photoproduct has a memory time of more than one day at room temperature;

and the photoproduct allows at least $10^4$ write/erase cycles with retention of at least 50% of the original contrast ratio;

and a pH of the composition is between 3 and 11;

and a water content of the composition is between 1% and 30% by weight, based on the total weight of the composition;

and auxiliaries for modulation of the proton mobility are present in a concentration of between 1% and 80% by weight, based on the amount of a purple membrane variant employed; wherein the auxiliaries used to modulate the proton mobility are at least one substance selected from the group consisting of glycerol, glycols, mono-, di-, and polysaccharides and mono- or polyfunctional alcohols; and optionally matrix materials are present in a concentration of up to 10% by weight, based on the total weight of the composition.

2. A composition as claimed in claim 1, containing bacteriorhodopsin variant $BR_{D85,96N}$.

3. A composition as claimed in claim 1, wherein the matrix materials employed are polyacrylamide, gelatin, agarose, agar, polyvinylpyrrolidone, polyvinyl alcohol, polyvinyl acetate, polyhydroxymethyl acrylate or mixtures thereof.

4. A composition as claimed in claim 1, wherein the absorption maxima of the initial state and of the photoproduct are in the emission region of solid or semiconductor lasers.

5. In a method for reversible optical information recording, the improvement which comprises utilizing a composition as claimed in claim 1, for reversible optical information recording.

6. In a method for non-destructive reading of information, the improvement which comprises utilizing a composition as claimed in claim 1, in a process which enables non-destructive reading of information.

7. In a method for holography or for pattern recognition for optical neural networks and/or associative memories, the improvement which comprises utilizing a composition as claimed in claim 1, in said holography or in said pattern recognition or in said optical neural networks and/or said associative memories.

8. In a method for providing optical elements, the improvement which comprises utilizing a composition as claimed in claim 1, as said optical elements.

9. In a method for using a composition in combination with a transient storage medium, the improvement which comprises utilizing a composition as claimed in claim 1, in combination with a transient storage medium.

10. In a method for using a composition in a mixture with purple membrane variants, the improvements which comprises utilizing a composition as claimed in claim 1, in mixtures with other purple membrane variants.

11. A composition as claimed in claim 1, wherein the configuration of the retinal chromophor of the photoproduct is 9-cis.

12. A process for the storage and non-destructive reading of information in a composition said composition containing at least one purple membrane variant in which more than 50% of a bacteriorhodopsin variant is converted at room temperature into a photoproduct having an absorption maximum which is shifted spectrally by at least 10 nm compared with the absorption maximum of the initial state by irradiation with light having a wavelength in the region of the absorption band of the initial state, where the photoproduct can be converted back into the initial state by irradiation with light having a wavelength in the region of its absorption band, wherein the configuration of the photoproduct which is a retinal is modified compared with the configuration of the retinal of the initial state and is different from 13-cis;

or a Schiff base bond of the retinal has been hydrolyzed;

and the photoproduct has a memory time of more than one day at room temperature;

and the photoproduct allows at least $10^4$ write/erase cycles with retention of at least 50% of the original contrast ratio;

and a pH of the composition is between 3 and 11;

and a water content of the composition is between 1% and 30% by weight, based on the total weight of the composition;

and auxiliaries for modulation of the proton mobility are present in a concentration of between 1% and 80% by weight, based on the amount of a purple membrane variant employed; wherein the auxiliaries used to modulate the proton mobility are at least one substance selected from the group consisting of glycerol, glycols, mono-, di-, and polysaccharides and mono- or polyfunctional alcohols; and optionally matrix materials are present in a concentration of up to 10% by weight, based on the total weight of the composition;

said process comprising the steps of storing the information by irradiation of the composition with linear-polarized light having a wavelength in the region of the absorption maximum of the initial state of the bacteriorhodopsin variant present in the composition, and detecting the information stored in this way by determining the change in the polarization state of a linear-polarized photochemically inactive detection beam after it has passed through the composition, where the detection beam is polarized neither perpendicular nor parallel to the polarization direction of the recording light.

* * * * *

UNITED STATES PATENT AND TRADEMARK OFFICE
CERTIFICATE OF CORRECTION

PATENT NO. : 6,274,279 B1 Page 1 of 1
DATED : August 14, 2001
INVENTOR(S) : Hampp et al.

It is certified that error appears in the above-identified patent and that said Letters Patent is hereby corrected as shown below:

Title page,
Item [22], please insert the PCT data as follows:
-- PCT Filed: August 12, 1993
PCT No. PCT/EP93/02154
§ 371 Date February 3, 1995
§ 102(e) Date: February 3, 1995
PCT Pub. No.: WO 94/05008
PCT Pub. Date: March 3, 1994 --

Signed and Sealed this

Seventeenth Day of September, 2002

Attest:

*Attesting Officer*

JAMES E. ROGAN
*Director of the United States Patent and Trademark Office*